Figure 1:
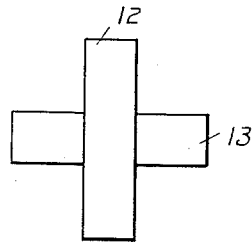

Nov. 14, 1939.  A. J. EDGE ET AL  2,179,545
RESISTANCE ELECTRIC WELDING
Filed Jan. 28, 1937

INVENTOR

Patented Nov. 14, 1939

2,179,545

UNITED STATES PATENT OFFICE 2,179,545

RESISTANCE ELECTRIC WELDING

Alfred J. Edge, Savannah, Ga., and Walter S. Edge, Pittsburgh, Pa.

Application January 28, 1937, Serial No. 122,880

1 Claim. (Cl. 219—10)

Our invention relates to resistance electric welding of metals such as steel, copper, aluminum, bronze, etc., but it has particularly to do with the efficient welding of high strength material such as hard drawn low carbon steel wire, and high tensile wire, with relatively soft wire. It also applies to other material in which a portion of the high unit strength is due to other forms of cold work, as for example, cold rolling.

One object of our invention is to produce a weld or connection between wires in which there is no eccentricity at the connections.

Another object is to produce a weld which is as strong or stronger in tension than the units which are welded, and to do it in a single operation.

Another object is to produce a weld between two units which is as strong as or stronger in tension, adjacent to the weld, than the units which are welded.

Another object is to produce a weld between two units which is stronger in bending at, and adjacent to the weld, than the units which are welded.

Still another object is to enable us to weld two hard drawn low carbon wires so that the welded structure will develop as much, or greater tensile strength, than the wire will develop, before welding.

Another object is to enable us to weld a hard drawn low carbon wire to a softer wire and obtain the results enumerated above.

Another object is by means of apparatus and methods, which we have developed, to accomplish these results in a rapid and practical manner.

The principal object of our invention is to enable us to take advantage of the superior strength of hard drawn wire and cold rolled steel in order to use them efficiently in structural members which form the basis of a very economical system of construction developed by us and, on which we have applied for patents. Prior to our invention, there was no known commercial way in which this could be done.

In referring to low carbon steel wire, we mean, that in which the carbon content is 0.20% or less. Such wire, when drawn soft, as it is for ordinary resistance welding, for example, in the manufacture of welded wire mesh, will weld satisfactorily in commercial machines. Ordinarily, the weld will be as strong as the wire; tension tests, made of the wire cut from this mesh, which includes several welds, will generally show a break between the welds and such material will generally show a unit tensile strength of from 60,000 to 70,000 pounds per square inch. If the same wire is hard drawn, however, so that it has a unit strength of 115,000 to 118,000 pounds per square inch, its properties are changed. When welded into a mesh by ordinary commercial means and tested in tension, it will break adjacent to or in the welds, at a load considerably less than the strength of the unwelded wire. A large part of the strength of this wire is due to the cold work of "drawing" and the heat developed by the weld anneals the metal adjacent to the weld. Our invention enables us to overcome this difficulty and permits us to gain other structural advantages at the same time, as will be hereinafter disclosed.

In some of the structural members which form a part of our system of construction, it is not only important that the welded joint between two members develop the full tensile strength of the member at the weld and adjacent to the weld, but it is advantageous for the welded joint to be able to develop a greater resisting moment to bending in the plane of the two elements than can be developed by either of the component members. Ordinary commercial welding cannot produce these results. By our method of welding, we take advantage of the heat developed at the weld, which softens the adjacent portions of the member, to forge or press the joint into a shape which gives us the properties desired. This is done in a single operation and is performed at high speed and at no increased cost over present commercial welding.

Figure 2:
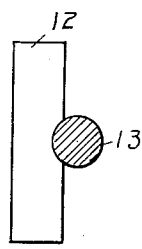
Figure 3:
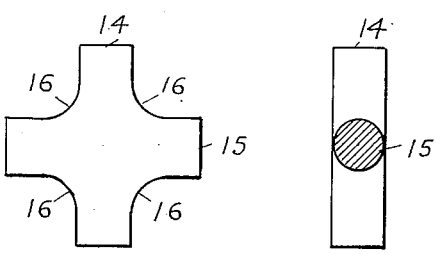
Figure 4:
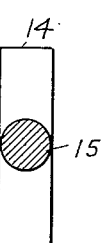
Figures 5, 6, 7, 8, 9:
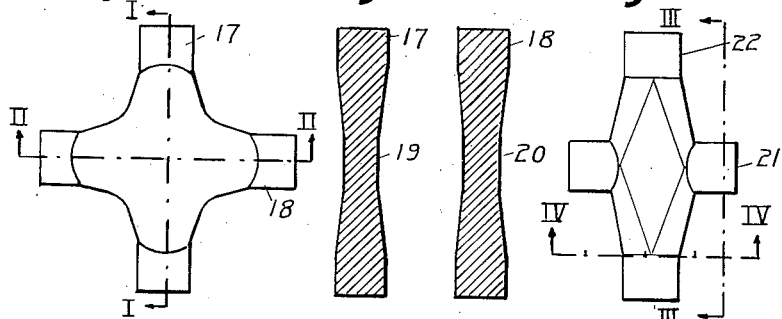
Figure 10:
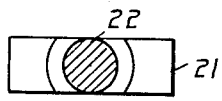
Figure 11:
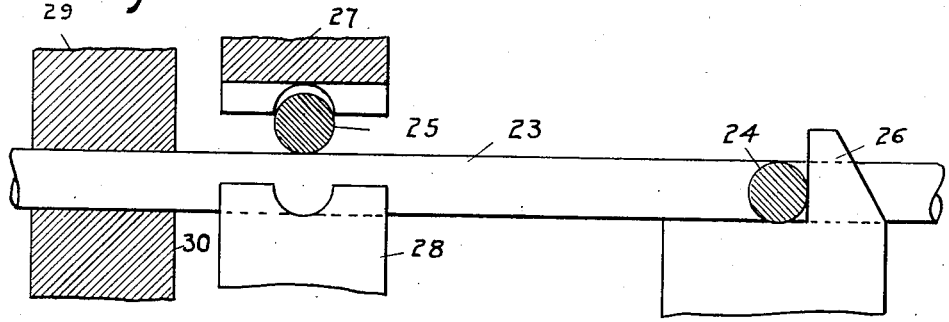

Referring now to the drawing, Figure 1 is a plan and Figure 2 is an end view of an ordinary resistance weld as made with soft wire in a commercial welding machine. Figures 3 and 4 are corresponding views of a resistance weld, as made by our method. Figure 5 is a plan of another form of weld. Figure 6 is a section on line I—I of Fig. 5 and Figure 7 is a section on line II—II of Fig. 5. Figure 8 is a plan of a slightly different form of weld. Figure 9 is a section on line III—III of Fig. 8 and Figure 10 is a section on line IV—IV of Fig. 8. Figure 11 shows a side elevation of a part of a welding machine arranged to make upset welds of several types.

Now considering the drawing in detail, we see that Figure 1 is a plan view of two round wires 12 and 13 which are welded together at right angles and from the end elevation, Figure 2, we see that they are only pushed into each other part way in the welding process. The usual method by which this welding is accomplished is to bring the two wires 12 and 13 into position between two dies, apply pressure, switch on a low voltage electric current and then switch it off as soon as the weld is completed. The current may be broken automatically when the welding dies approach each other a certain distance, in which case, we have a depth weld. Or the current flow may be cut off by a timing device, such as a commutator, after it has been on for a fixed time, in which case, we have a time weld. For most commercial purposes, the latter method is preferred. The weld shown in Figures 1 and 2 is quite satisfactory for soft wire but eccentric. By this, we mean that a load applied to one wire being resisted by the other wire, produces a rotation in the second wire and a tendency to bend in the first wire. From a structural standpoint this is objectionable as it sets up secondary stresses in the members.

The weld shown in Figures 3 and 4 is free from this last objection. This weld is produced by using specially shaped dies which are brought clear down at the instant the weld is made so that the thickness of the two wires 14 and 15, is reduced to practically that of a single wire. The current is exactly controlled by a timer to avoid excessive heat and the hot metal is forced out at points 16 to fill the welding dies as shown. This gives a very strong weld, one that may be made stronger than the component wires and, in the plane of the two wires, it will show a greater resisting moment than the wire itself. By gripping the two wires on either side of the welding dies before the weld is made, the upsetting effect can be increased.

In Figures 5, 6, and 7, is shown a weld in which the dies are of a slightly different shape and are brought down more than in Figure 3, to produce a section somewhat thinner at 19 and 20 than the wires 17 and 18 of which it is made. The flattening is carried out further from the weld in all four directions. This produces a joint of great stiffness in the plane of the two wires 17 and 18 and adapts it well for use in structural members or fabric of the rigid frame type where separate sway bracing is not introduced to carry shearing stresses.

In Figures 8, 9 and 10, we show a weld that is particularly adapted to be used with hard drawn low carbon wire or with a combination of such a wire with a softer wire. By gripping both wires on either side of the weld and applying axial pressure towards the welding dies on both wires at the instant of welding, any reasonable amount of upsetting can be obtained. Figure 8 represents the welding of a soft wire 21 to a hard drawn wire 22. The reduction in strength in the hard drawn wire 22, due to the annealing action of the weld, is compensated for by the increased cross section due to the upsetting of the metal at the weld.

In Figure 11 is shown a part of a welding machine adapted to produce upset welds of the types referred to and to weld hard drawn and soft wire without any loss of efficiency at or near the welds. In this figure the machine is supposed to be set to produce welds of the type shown in Figures 8, 9, and 10. Here 23 represents a hard drawn wire corresponding to 22, and 24 and 25 represent soft cross wires corresponding to 21 in Figures 8, 9, and 10. Soft cross wire 24 has been welded to hard drawn wire 23 and the welded unit has been moved to the position shown in the regular operation of making a welded fabric. Cross wire 24 is held and restrained from moving further from the welding dies 27 and 28 by the dog 26. On the other side of the welding dies 27 and 28, the wire 23 is gripped by jaws 29 and 30, which hold it firmly at the instant of welding. It will be understood that the direction of feed of this machine is from left to right and that soft cross wire 25 is fed into the machine transversely between welding periods. In Figure 11, the wire 25 has just been fed into place above wire 23 and under welding die 27, which is shown in part section. Wire 23 rests on the lower welding die 28 which is shown in elevation and the drawing represents the movement of the machine to be at the point where the upper die 27 is just about to descend and apply pressure to the two wires. In the next step, die 27 is brought down on wire 25 forcing it against wire 23, a low voltage current passes through 27, 25, 23 and 28 and the pressure, which is still acting on 27, brings the upper die 27 down quickly, causing the soft hot metal to fill the two dies, thus producing a joint of the pattern described, at the instant of forming the weld. Jaws 29 and 30 and holding dog 26 may remain stationary during the welding operation or one or both of them may be forced towards the welding dies at the instant of welding, compressing the wire 23 axially at the weld and causing any reasonable amount of upset at the joint required. It will be seen that these operations may be performed just as rapidly as present commercial welding is performed and the resulting product is very much superior for our purpose.

Having thus described our invention, what we claim is:

The method of forming resistance welds between two metal members which consists of bringing the two members together in crossed relation, passing an electric current through their point of contact, applying pressure to force them together and simultaneously applying pressure to one of the members in directions axially thereof and toward the weld, to cause an upsetting action at the weld.

ALFRED J. EDGE.
WALTER S. EDGE.